United States Patent [19]

Black et al.

[11] Patent Number: 5,322,996

[45] Date of Patent: Jun. 21, 1994

[54] MIRROR WITH DYNAMIC DAZZLE LIGHT ATTENUATION ZONE

[75] Inventors: Michael Black, Foster City; Mikhail Spitkovsky, Sunnyvale, both of Calif.

[73] Assignee: Reliant Laser Corporation, Foster City, Calif.

[21] Appl. No.: 54,037

[22] Filed: Apr. 28, 1993

[51] Int. Cl.$^5$ .............................................. H01J 40/14
[52] U.S. Cl. .................................. 250/214 AL; 359/85
[58] Field of Search ............ 250/214 AL, 214 B, 216; 359/70, 85

[56] References Cited

U.S. PATENT DOCUMENTS

| | | | |
|---|---|---|---|
| 4,696,548 | 9/1987 | Ueno et al. | 359/70 |
| 4,721,364 | 1/1988 | Itoh et al. | 359/85 |

*Primary Examiner*—David C. Nelms
*Assistant Examiner*—K. Shami

[57] ABSTRACT

A mirror (10) with a pair of vertical dazzle light attenuation zones (24 and 26). Each zone consists of stripes (24a, 24b, ... 24n, 26a, 26b, ... 26n) capable of dynamically adjusting the widths and the attenuation intensity of the attenuation zones (24 and 26). The mirror (10) has a multi-layered structure containing a liquid crystal (32). The positions and widths of the stripes are controlled manually via adjustment pushbuttons (20 and 22), or automatically, in response to the intensity of the incident light. When a driver sees during night driving the reflection of the dazzling light in the non-attenuated areas of the mirror, the driver's head is slightly moved, or the driver manually shifts by pushbuttons (20 and 22) the groups of the attenuated stripes (24 and 26) to the position where the dazzling light (L) will be covered by these stripes. The localized attenuation of the mirror's surface will not disturb the overall view observed by the driver through the rearview mirror (10).

20 Claims, 6 Drawing Sheets

MIRROR WITH DYNAMIC DAZZLE LIGHT ATTENUATION ZONE

BACKGROUND

1. Field of the Invention

The present invention relates to mirrors, particularly to a vehicle rearview mirror which blocks excessive light levels, e.g., caused by headlight glare.

2. Description of Prior Art

During night driving, when a first car is followed by another car which has its bright lights on, these bright lights are reflected from the rearview mirror into the eyes of the car's driver. This can seriously impair the driver's forward vision because the light scatters within the driver's eyes, causing a "veil" or "curtain" of light over the scene. The driver therefore has reduced ability to detect objects which are dimly lit or have little contrast with the background. This situation is known as visibility glare. The driver is normally unable to detect this loss of visibility since it produces no physical sensation. At higher reflected light levels, this glare becomes uncomfortable, resulting in an unpleasant physical sensation in the driver's eyes.

To alleviate this problem, manually actuated rearview mirrors have been developed which include "day" and "night" settings. These day-night mirrors are installed almost in all modern cars and include front and rear mirrors joined at an angle to form a prism and a mechanism for changing the angular orientation of the prism. The front mirror is half-silvered. In the day setting, the rear mirror is angularly set to the working position to provide approximately 80% reflectance. In the night setting, the front mirror is angularly set to the working position to provide only approximately 4% reflectance.

Additionally, automatic day-night rearview mirrors have been developed which automatically switch the mirror prism between full and partial reflectance states in response to sensed light levels. One such mirror is illustrated in U.S. Pat. No. 4,443,057, issued Apr. 17, 1984, to Bauer et al. The Bauer mirror includes a forward light sensor for measuring light in the forward direction, a rear light sensor for measuring light in the rear direction, and a control circuit responsive to the forward and rear light sensors to control the mirror prism.

These automatic mirrors all suffer a common drawback. Specifically, the light sensors used in these mirrors have a response to the electromagnetic spectrum which is substantially different from the spectral response of the human eye. Accordingly, the sensitivities of the light sensors to visible and invisible wavelengths are different from the sensitivities of the human eye. Most notably, light sensors are extremely sensitive to infrared and longer wavelengths which cannot be seen by the human eye. Infrared wavelengths are prevalent in artificial lighting, particularly in tungsten filament bulbs. The light sensors detect relatively high light intensities when viewing headlights, taillights, streetlights, or any other source of infrared wavelengths. Consequently, the reflective element of a mirror incorporating such sensors is driven to an inappropriate reflective state. The mirror therefore is sometimes actuated when not necessary to meet the sensitivity of the human eye. As a result, either inadequate image information is presented to the driver and/or excessive glare from the rearview mirror is directed to the driver's eye.

An attempt has been made to obviate the disadvantages of the above-mentioned light sensors by utilizing filtered light sensors of the type described in U.S. Pat. No. 4,799,768, issued Jan. 4, 1989, to E. Gahan. The Gahan light sensor includes a detector responsive to electromagnetic wavelengths and a filter for filtering the wavelengths received by the detector, so that the spectral response of the light sensor approximates the spectral response of the human eye. Nevertheless, this rearview mirror switches the entire surface of the mirror into the "night" state. Furthermore, this mirror is based on the use of light sensors, and such sensors essentially attenuate the incident light to a certain level, or otherwise reflect the incident light in a certain direction. This causes distortion of a reflected image.

Another disadvantage, common to all two-position prism mirrors, is that such a prism is strictly a dual reflectance device which allows no option for a continuously variable reflectance or for intermediate reflectance states. Dual reflectance mirrors are highly inadequate because they distort and shift images.

A glare-free reflection mirror is shown in U.S. Pat. No. 4,721,364, issued Jan. 26, 1988 to H. Itoh et al. This mirror has an electro-optical element, the transparency of which is changed by applying an electrical field to this element. The mirror is divided into a dazzle-free zone in the lower part of the mirror's surface and a non-dazzle-free portion at the rest of the mirror's surface. Such rough regional localization of the mirror's surface reduces the field of vision at nighttime. Furthermore, the Itoh mirror possesses the same disadvantages as the other sensor-type mirrors described above.

Recently, rearview mirrors using liquid crystal devices having light absorption properties have been designed. One such nonglare mirror is described in U.S. Pat. No. 4,671,617, issued Jun. 9, 1987 to K. Hara. Mirrors of this type incorporate a liquid crystal device. In this device, the orientations of the liquid crystal molecules are changed to absorb light when the amount of the light incident on the mirror exceeds a certain limit.

There are many other dazzle-free mirrors based on the use of liquid crystals which are described in various publications. Each such mirror is aimed at the elimination of certain drawbacks of the existing liquid-crystal mirrors, such as: the prevention of a chemical reaction in the dichromatic dye of the liquid crystal (U.S. Pat. No. 4,848,878 issued Jul. 18, 1989 to E. Lee et al.); the provision of a control device to automatically initialize the antidazzle mirror to a selected mode of a predetermined antidazzle or dazzle state, when power is applied from a battery (U.S. Pat. No. 4,786,145 issued Nov. 22, 1988 to H. Demura, et al.); the elimination of interference fringes which often occur under monochromatic light sources, such as sodium or mercury lamps (found over highways), or the halogen lamps of automobiles (U.S. Pat. No. 4,729,638 issued Mar. 8, 1988 to Y. Shirai), and so forth.

A common disadvantage of all existing liquid-crystal dazzle-free mirrors is that they cannot provide efficient attenuation of the dazzling light. This is because the light attenuation effect is distributed over the entire surface of the mirror, causing the entire mirror to become dim even through a bright light shines in only a small area of the mirror.

An attempt has been made to solve the above problem by providing a liquid-crystal matrix-type reflection mirror with a localized dazzle light attenuation zone. The construction of this mirror is described in U.S. Pat. No. 5,168,378, issued Dec. 1, 1992 to Michael Black, et al.

The mirror has a multilayered structure and consists of a broadband reflective base mirror having maximum reflectivity in the range corresponding to the spectral range of halogen lamps of automobile headlights. Deposited on the base mirror are a matrix transparent electrode and a photoconductive layer placed on the matrix transparent electrode. The photoconductive layer and the matrix transparent electrode have a matrix-type structure formed as a pixel array. Each pixel of the matrix transparent electrode is a projection of an overlaid pixel of the photoconductive layer.

The multilayered structure further includes the following subsequent layers: a rear polarizer which has a predetermined axis of polarization and is placed on the photoconductive layer, a common transparent electrode, a liquid crystal sandwiched and sealed between the rear polarizer and the common transparent electrode, a front polarizer, and an antireflection coating.

The mirror has a control circuit connected between the common transparent electrode and the matrix transparent electrode. The control circuit applies a control voltage to the liquid crystal in accordance with the incident light. The pixel enables just the dazzle light zone to be attenuated.

Although the mirror described in this patent will solve the problems described above for concentrated light beams, such as a laser beam, it will not work with optimal efficiency in the case of a vehicle rearview mirror. This is because a diverging beam of automobile's headlights, which reaches the surface of the rearview mirror of a particular vehicle, is much wider than the surface of the mirror itself. In other words, the entire rearview mirror in front of the driver will be illuminated by the beams of the car behind it.

Moreover, the driver sees the reflection of the headlights, and the position of this reflection in the mirror depends on the position of the driver's eyes. In other words, when the driver's head moves, the driver sees the reflection of the headlight in a different place of the mirror, while the entire mirror remains illuminated with a wide beam of the headlights, the width of which in the plane of the mirror is much wider than the width of the mirror. The distance from the driver's eyes to the plane of the mirror is much shorter than the distance from the light source to the plane of the mirror. Therefore a change in the position of the driver's eyes will change the position of the reflected image of the light source seen by the driver to a greater extent than would result from a change in the position of the light source. Thus, the principle of attenuation of one bright point or small zone on the mirror does not work optimally for non-concentrated light beams, such as those emitted by automobile headlights.

Furthermore, since the rearview mirror is located close to the driver's eyes, due to the binocularity of human vision, the driver sees the reflection of the dazzling spot as two images, which are converted in the brain into a single image.

More specifically, when a driver looks with both eyes at a small object located remotely, e.g., at a distance of several meters, the driver sees this object with both eyes as a single image. When this object is moved closer to the viewer's eyes, at a certain distance the viewer sees two images (one for each eye). Therefore, the driver will subconsciously see the dazzling spot. Strictly speaking, the driver sees two dazzling spot images, one with each eye. Thus, even if only a local area of the mirror, corresponding to the reflection of the dazzling point is attenuated, the reflected image of this dazzling spot will not be attenuated completely.

Another disadvantage of this mirror is that it has only two stable conditions, i.e., an attenuated state and a non-attenuated state. In other words, the control voltage of the active matrix is determined by a threshold device and is switched over discretely between the attenuated and the non-attenuated state.

OBJECTS AND ADVANTAGES OF THE INVENTION

It is an object of the invention to eliminate the above disadvantages, i.e., to provide a liquid-crystal-type reflection mirror with a dazzle light attenuation zone, which efficiently attenuates the diverging beam of the automobile headlights. Another object is to provide a liquid-crystal-type reflection mirror which attenuates stripe-like zones of the mirror, and in which the attenuated stripes are arranged so that by a slight movement of the head the driver is always able to see only the attenuated image of the light. Still another object is to provide a liquid-crystal mirror in which the degree of attenuation is proportional to the brightness of the dazzling light, and in which the position and the width of the attenuated stripes can be adjusted. A further object is to provide a mirror with attenuation zones, taking into account the binocularity of the human vision.

Further advantages and features will become apparent from a consideration of the ensuing description and drawings.

SUMMARY OF THE INVENTION

A mirror is provided with a dazzle light attenuation zone which consists of stripes capable of adjusting the width and the attenuation intensity of the attenuation zone. The mirror has a frame which supports a multilayered mirror plate. This mirror plate has a light-reflecting layer, a liquid-crystal plate having a plurality of striped mutually isolated transparent electrodes, and another layer which constitutes a common electrode. The frame supports light sensors facing the light incident on the mirror plate. A control circuit which is connected to the light sensors contains a multiple threshold device, a control driver unit, and a power source. The light sensors are connected to the multiple threshold device, while the latter is connected to the control driver unit. The control driver unit, in turn, is connected to the power source, to the common electrode, and to the abovementioned striped transparent electrodes. The striped electrodes are divided into two independently controlled groups. The frame also supports adjustment pushbuttons for manually changing the width of each group of the stripes, or for shifting these groups in the horizontal direction across the mirror. Another embodiment provides groups of transparent stripe-like electrodes, the widths and positions of which are changed automatically in response to the intensity of the incident light.

Figure 1:
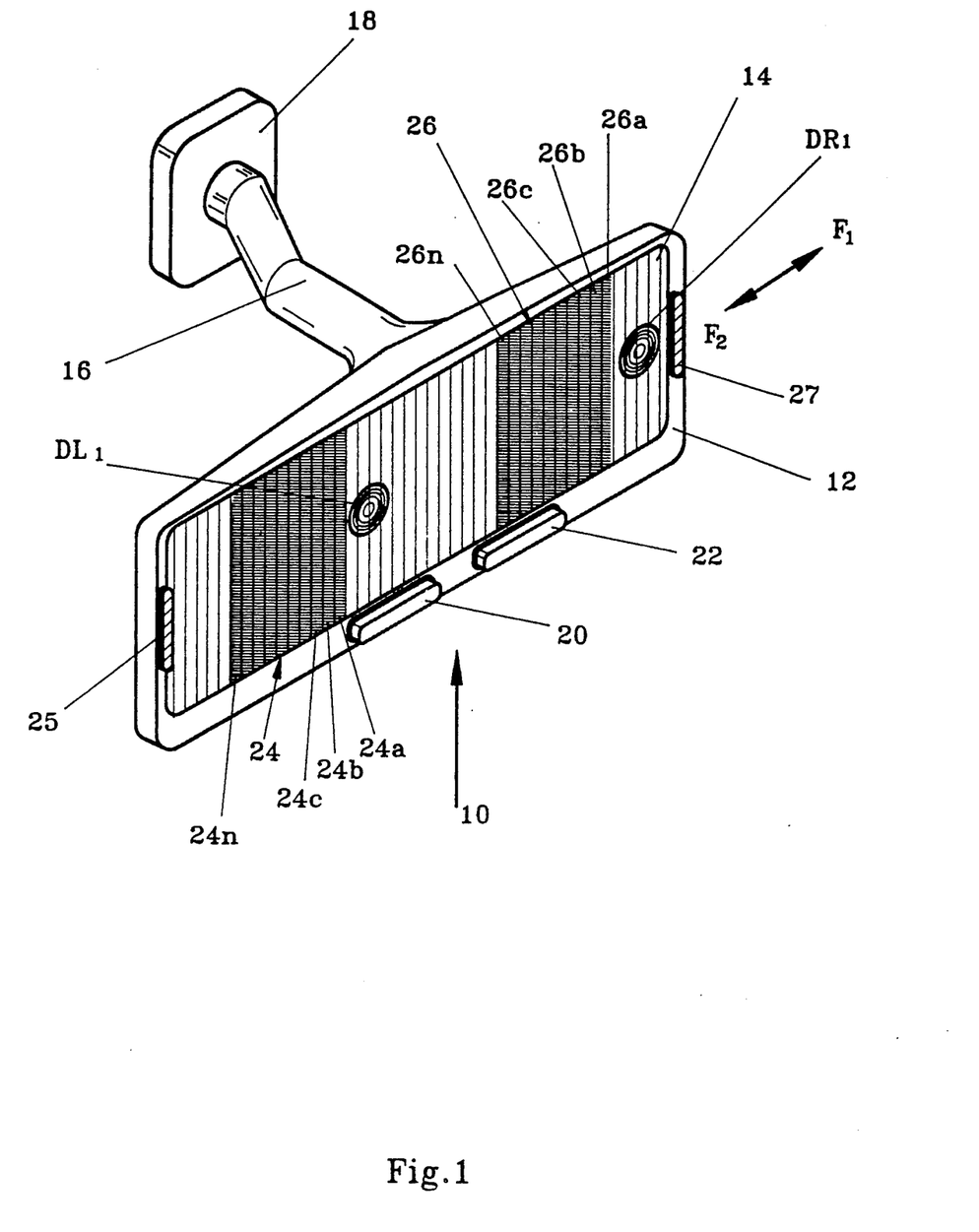
FIG. 1 is a perspective view of a multilayered, liquid-crystal, striped antidazzle mirror of the invention, the reflection of a dazzling light being beyond the attenuated zone.

FIG. 1—Detailed Description of the Apparatus of the Invention

FIG. 1 is a perspective view of a multilayered, liquid-crystal, striped antidazzle mirror of the invention with a dynamically attenuated dazzle light zone. In the context of the present invention, the word "dynamic" or "dynamically" means that the width and the degree of attenuation of the mirror attenuation zone may be manually or automatically changed in proportion to the intensity of the dazzling light. As can be seen from this drawing, a mirror 10, which is shown as an automobile rearview mirror, has a frame 12 which supports a multilayered mirror plate 14. Attached to frame 12 is an arm 16 which terminates in a flange 18 used to secure the mirror to the interior of the automobile (not shown).

Located on the front side of frame 12 are two pushbuttons 20 and 22. Shown on the surface of mirror 10 are two vertical zones 24 and 26. Each zone is darkened in the drawing and consists of a plurality of narrow vertical stripes 24a, 24b, 24c ... 24n and 26a, 26b ... 26n, respectively. Blackened vertical zones 24 and 26 correspond to attenuated zones of the mirror and pushbuttons 20 and 22 are intended to control the widths of the attenuated zones and their displacements in the direction of arrows F1 and F2. Frame 12 supports on its sides light sensors 25 and 27 which determine the intensity of the incident light which falls onto mirror 10. The mechanism which controls the adjustment of the attenuation zones will be described later after a consideration of the multilayered structure of mirror plate 14.

Figure 2:
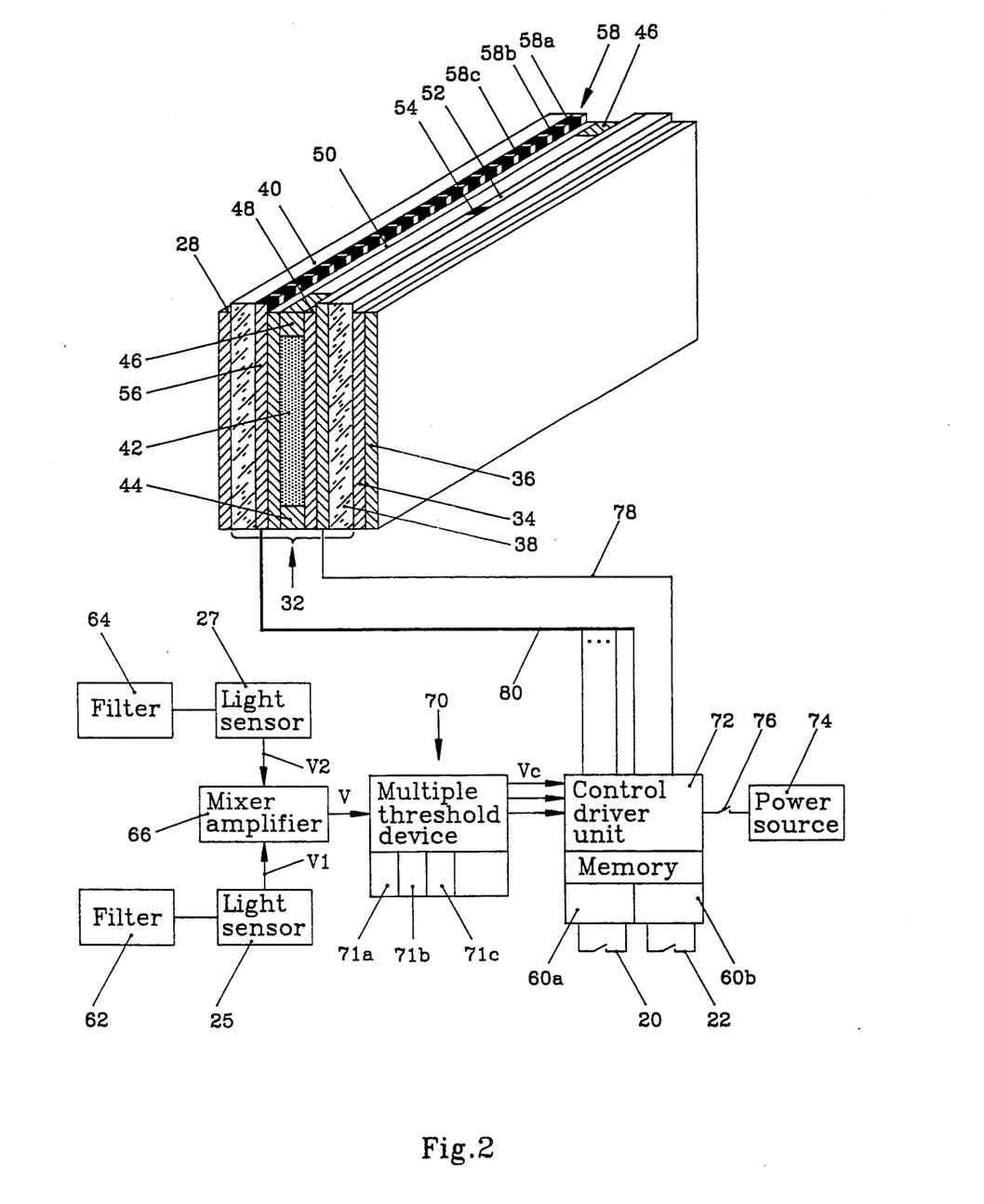
FIG. 2 is a schematic three-dimensional view of the mirror plate of FIG. 1 illustrating its multi-layered structure and a control circuit.

FIG. 2 is a schematic three-dimensional view of mirror plate 14 of FIG. 1 illustrating its multi-layered structure and a control circuit. Mirror plate 14 consists basically of four main layers, i.e. a reflection coating 28, a liquid-crystal (LC) plate 32, a polarizer 34, and an antireflection layer 36. Each of these components will be considered separately in greater detail.

The rearmost layer is reflection coating 28 which is applied onto a rear transparent glass support 40 of LC unit 32. This coating comprises a reflector with a broadband spectral reflectivity and may also comprise a magnesium fluoride film having a thickness which falls within the range of 5 to 15 $\mu$m.

Thus, one side of LC unit 32 is in contact with polarizer plate 34, while its opposite side is coated with reflection coating 28.

The polarizer plate is a polymer film, e.g., of Nitto Electric Industrial Co.., Ltd., Japan, which has a thickness of 0.2 to 0.3 mm.

LC unit 32 is a commercially produced product which is available on the market and may be purchased, for example, from VIKAY Industrial PTE Ltd., Singapore. It consists of a front transparent glass substrate 38 and a rear transparent glass support 40. Located between these transparent glass plates is an LC 42 which comprises a conventional nematic-type LC such as that sold under the trademark Merck ZLF-2244-100 by Merck & Co., Inc. of Rahway, N.J., USA. LC 42 is sealed over the entire periphery of the mirror by means of spacers 44 and 46. Located between striped transparent electrodes 56 and LC 32, as well as between common electrode 52 and LC 32 are orientation layers 48 and 50. The orientation layer has orientation grooves (not shown) intended for the proper orientation of molecules of LC 32. The structure and application technique of this layer is known in the art of LC displays. Orientation layers 48 and 50 may be made, e.g., of a structured polymer.

Located between orientation layer 48 and front substrate 38 is a thin continuous transparent common indium-tin-oxide (ITO) electrode 52. Electrode 52 has only one terminal 54. A second electrode 56, which consists of a plurality of stripes 24a, 24b, ... 24n, 26a, 26b, ... 26n (FIGS. 1 and 3), is located between glass substrate 40 and orientation layer 50. Electrode 56 is also made of ITO and has terminals 58a, 58b, ... 58n, each on a respective stripe 24a, 24b, ... 24n, 26a, 26b, ... 26n. Each stripe is electrically isolated from other stripes by an insulating coating (not shown).

Thus, LC 42 is located between common transparent electrode 52 and striped electrode 56 which together control the orientation of molecules of the LC by a voltage applied to electrodes.

Figure 3:
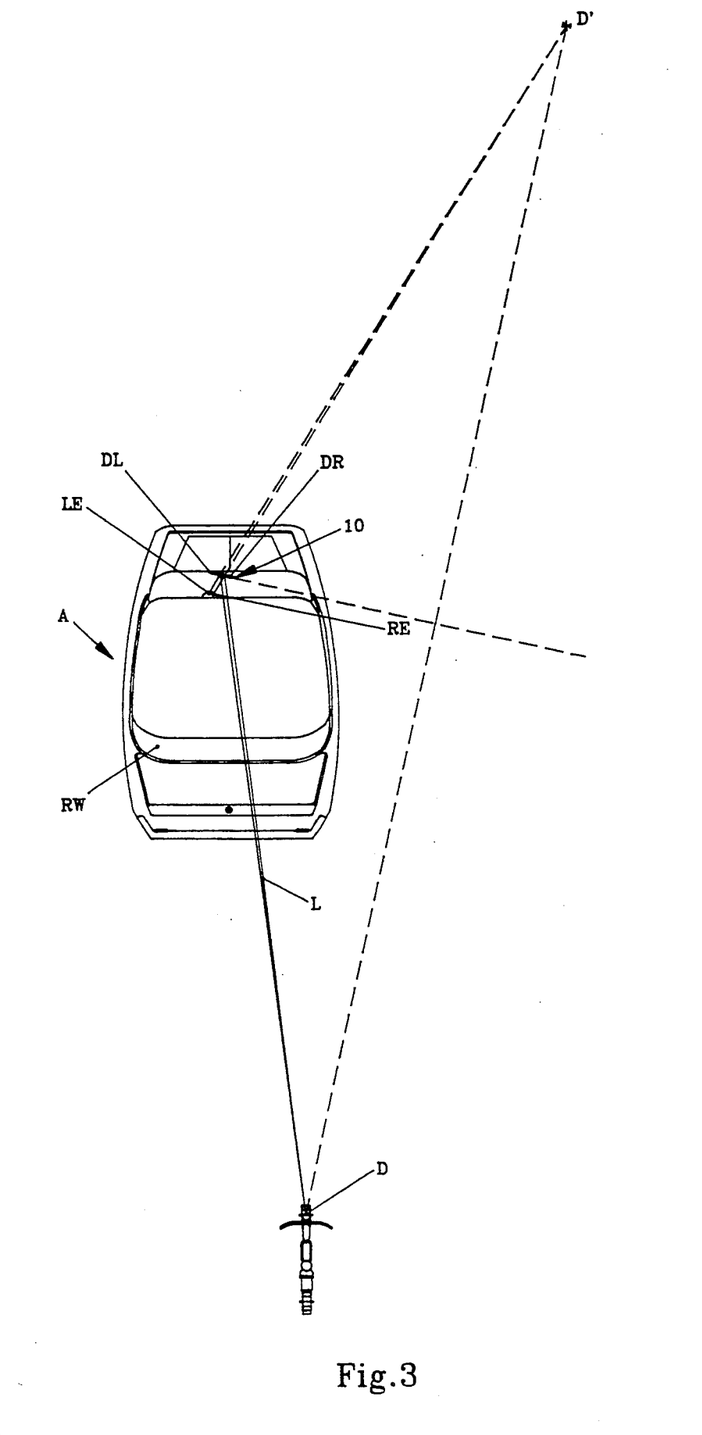
FIG. 3 is a schematic view illustrating the position of the reflected dazzling light relative to the driver's eyes.

As shown in FIGS. 1 and 3, each ITO stripe is oriented vertically and may have a width of 2-4 mm. The number of stripes is optional, but in general may be 10 stripes per inch of the mirror's width.

The lower part of FIG. 2 shows in a block-diagram form a circuit which controls the operation of rearview mirror 10. This circuit includes the above-mentioned light sensors 25 and 27 which are coated with filters 62 and 64, respectively. The bandwidths of these filters correspond to the spectral response of a human eye, so that only the visible light is passed to sensors 25 and 27. Under the effect of the incident light, sensors 25 and 27 generate respective voltage signals V1 and V2 which are supplied to a mixer amplifier 66. The latter mixes voltage signals V1 and V2, amplifies the resulting signal V. The mixer amplifier is connected to a multiple threshold device 70 to which the resulting signal V is supplied. Multiple threshold device 70 contains a number of comparators 71a, 71b, ... 71n, which produce output signals corresponding to input voltage V, and hence to the intensity of the incident light on mirror 10. Thus, multiple threshold device 70 produces on its output a control voltage Vc which corresponds to the output of the selected comparator and thus to the intensity of the incident light.

Multiple threshold device 70 is connected to a control driver unit 72. This unit is also connected to pushbuttons 20 and 22 on mirror frame 12 through memory device 60a and 60b, respectively, located in control driver unit 72. Pushbuttons 20 and 22 are intended for manually adjusting the widths and horizontal position of attenuated stripes. Control driver unit 72 also is connected to a power source 74, such as an automobile battery. Power source 74 may be connected to control driver unit 72 via a switch 76, which may be interlocked with the headlight switch of the automobile, the ignition key switch, or may comprise a separate switch. Electrical wires connecting power source 74 to control driver unit 72 of mirror 10 may be embedded into the windshield, or connected otherwise (not shown). Memory devices 60a and 60b remember and store the last setting of pushbuttons 20 and 22 after switch 76 is opened and power source 74 is disconnected. Control driver unit 72 has two outputs, i.e., a first output 78 which is connected to common electrode 52, while a second multiple output 80 is connected to respective terminals 58a, 58b, . . . 58n on stripes 24 and 26. Although multiple output 80 is shown connected to the respective stripe's terminal by a single line, it is understood that in reality each elementary output (not shown) of this output array is connected to a respective terminal 58a, 58b, . . . 58n via an individual insulated wire (not shown).

Memory device 60a determines the number of striped transparent electrodes 56 in the group of these electrodes connected to power source 74 through pushbuttons 20, while a second memory section 60b determines the position of each group of the electrodes in the horizontal direction of mirror 10.

FIGS. 1 through 5—Operation of the LC Mirror with Attenuation Stripes

In order to understand the principle of operation of mirror 10, first consider FIG. 3, which is a schematic view illustrating the position of the reflected dazzling light relative to the driver's eyes.

This drawing illustrates an automobile A in which the driver's eyes are shown at LE (left eye) and RE (right eye). Rearview mirror 10 is located in front of the driver and reflects the image of the picture seen through rear window RW. The dazzling light source is designated by D. Although such a light source will normally constitute two headlights of the following car, for the sake of simplicity the dazzling light source D is shown as a point.

Normally in human eyes an image seen by both eyes separately is presented to the viewer with normal binocular vision as a single image. In reality, and irrespective of the driver's will, the driver will see with the left eye LE and with the right eye RE the reflected images DL and DR of dazzling light source D, individually and in different positions of mirror 10. This may be easily proven by first closing one eye and looking at the image with the other eye, and then by repeating the procedure with the opposite eye. In both cases, the image will be in the mirror in different positions.

Automobile rearview mirror 10 described in FIGS. 1 and 2 operates in the following manner.

When the driver drives an automobile A in the dark, the driver turns the control circuit of the mirror ON by closing switch 76 (or this is done automatically when the driver turns on the automobile's headlights).

Figure 4:
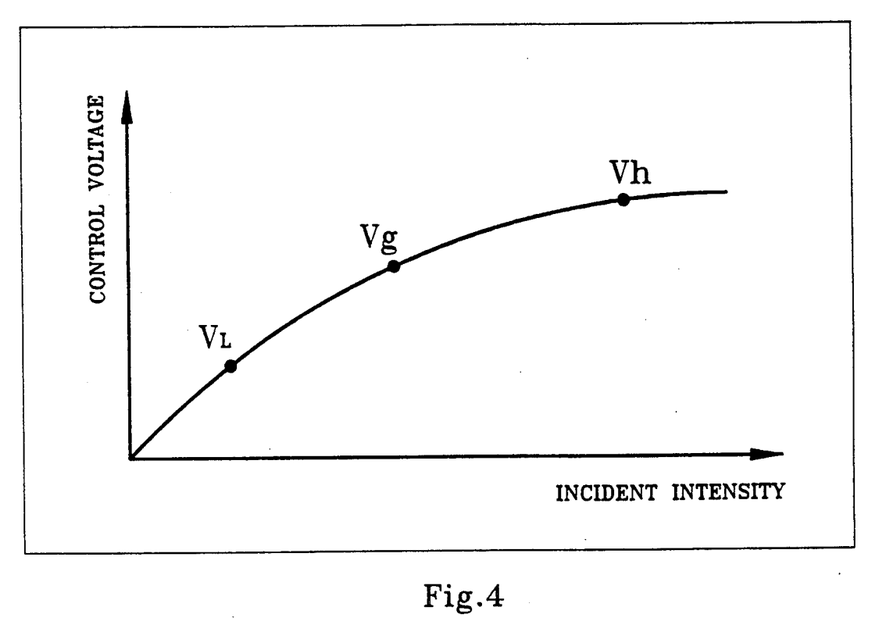
FIG. 4 is a graph illustrating an effect of the incident-light intensity on control voltage applied to the liquid crystal.

When switch 76 is closed, current flows from power source 74 to control driver unit 72. In the event there is no dazzling-light source behind automobile A, the signals which are supplied from light sensors 27 through mixer amplifier 66 and multiple threshold device 70 to the control driver unit are below the lowermost threshold of the multiple threshold device. As a result, the potential difference across LC unit 32 between common electrode 52 and the electrodes of a group of stripes 24 and 26 will be below a certain value $V_L$ shown in FIG. 4. FIG. 4 is a graph illustrating the effect of the incident-light intensity on control voltage applied to the LC.

Thus, the axes of LC molecules in LC unit 32 will turn only slightly with respect to the axis of polarization of polarizer plate 34. This will result only in a slight contrast of the energized stripes against the remaining stripes. This slight contrast will be seen only when some light, even a very dim light, falls onto mirror 10. Since, as has been mentioned above, control driver unit 72 has memory devices 60a and 60b, which remember the latest setting of pushbuttons 20 and 22, the number and positions of the stripes in the above-mentioned group will correspond to those of the latest setting which were stored in memory devices 60a and 60b after the system was switched off.

In the absence of a dazzle light source, the slight contrast mentioned above is so insignificant that mirror 10 has an almost uniform coloration over its entire surface, and acts as a conventional rearview mirror with a continuous and uniform surface.

FIG. 3 is a schematic view illustrating the position of the reflected dazzling light relative to the driver's eyes in the event that a vehicle with headlights which produce a dazzling reflection in mirror 10 appears behind automobile A. For the sake of simplicity of the explanation and illustration, first consider the case of a point light source, such as a light emitted by the motorcycle headlight (which, incidentally, is always dazzling, being always a high-beam light).

The dazzling light which falls onto mirror 10 is designated by L. The image of this light will be seen by the driver in a certain position as a single point (points DL and DR correspond to images seen by left eye LE and right eye RE, respectively). It is understood that in the case of a two-point light source the number of images will be doubled. Assume that the distance and relative position between light source D and mirror 10 remain unchanged.

When light L falls onto mirror 10, the signals are supplied from light sensor 27 through mixer amplifier 66 to comparators 71a, 71b, . . . 71n of multiple threshold device 70. The latter produces an output voltage on one of the comparators, the threshold level of which corresponds to the intensity of the incident light. As a result, multiple threshold device 70 sends to control driver unit 72 a voltage $V_c$ which is above at least the lowermost threshold of multiple threshold device 70. In other words, multiple threshold device 70 will generate voltage signal $V_c$ in proportion to the intensity of dazzling light L.

This voltage signal $V_c$ is supplied to control driver unit 72, which responds to this signal by producing on its outputs a certain potential difference $V_g$ (FIG. 4) which is above the value of $V_L$. There is a greater potential difference across LC unit 32 between common electrode 52 and terminals 58a, 58b, . . . of striped electrodes 56. Therefore, the molecules of LC 42 will turn by a greater angle with respect to the polarization axis of polarizer plate 34. Thus the above-mentioned groups of stripes will acquire a higher contrast relative to the remaining stripes.

Imagine that positions of the reflection of light source D in mirror 10, i.e., positions of points DL and DR, are seen by the driver in points of the mirror which are beyond the attenuated zones 24 and 26, and are determined by the latest set up and may not correspond to the present situation. This condition is shown in FIG. 1, where reflected image lights DL1 and DR1 are located (for the present fixed position of the driver's eyes with respect to the mirror) beyond the limits of attenuated zones 24 and 26 (which are darkened in FIG. 1).

Figure 5:
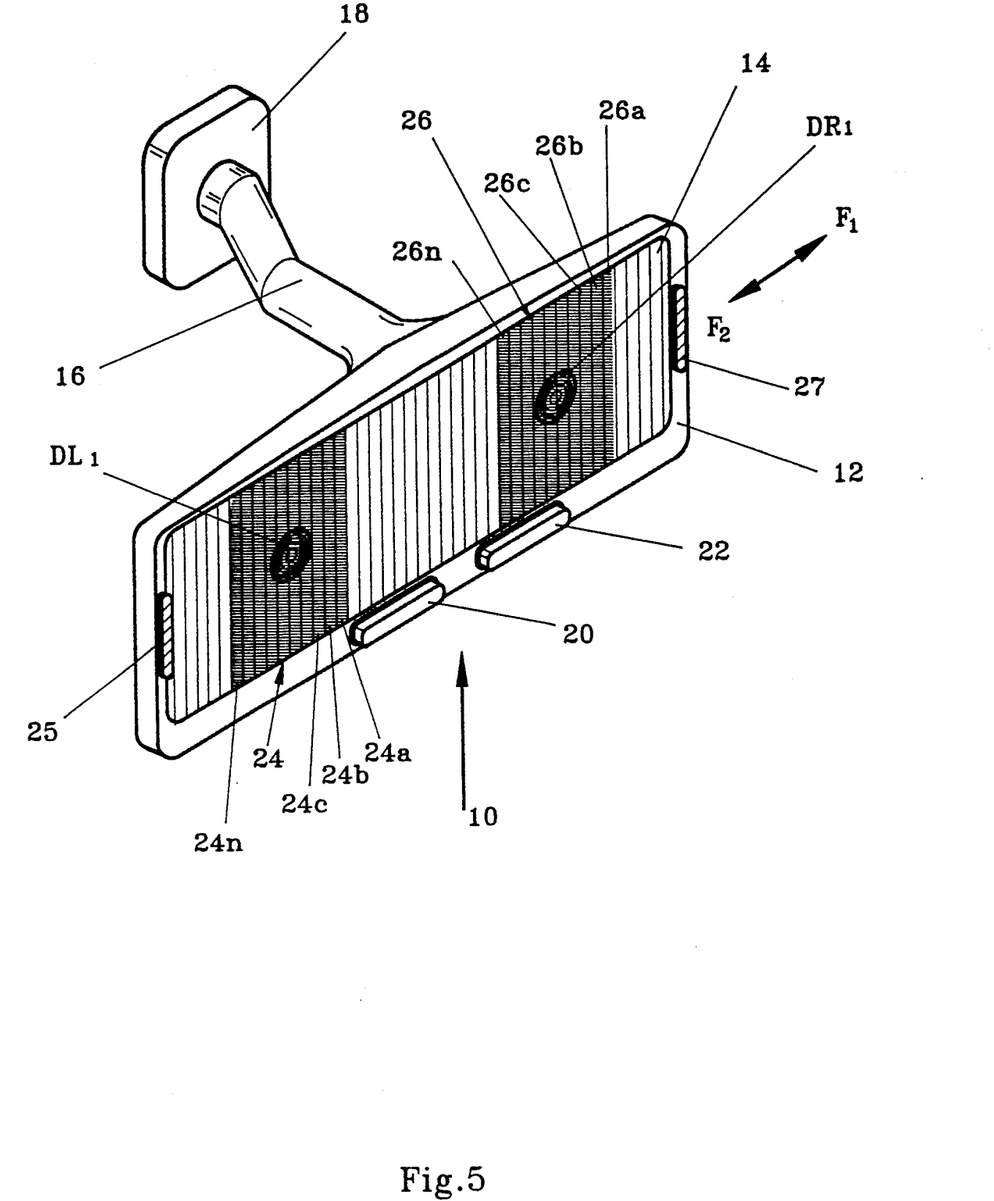
FIG. 5 is a view similar to FIG. 1 with the adjusted positions and widths of the attenuated stripes.

To correct the situation, the driver's head may either be shifted to a position where reflected images DL1 and DR1 are covered by attenuated zones, or the driver may shift the positions or the widths of the attenuated zones by means of pushbuttons 20 and 22. The activation of pushbutton 20 selects from memory device 60a the corresponding data, so that each push on pushbutton 20 incrementally adds another striped transparent electrode to the group of the electrodes connected to control driver 72. On the other hand, each push on pushbutton 22 selects from memory device 60b the appropriate data, so that with each push on pushbutton 22, both groups 24 and 26 of the stripes are shifted simultaneously and synchronously in the horizontal direction, e.g., from left to right to the end of the mirror, and then in the opposite direction. The reverse is also controlled by memory devices 60a and 60b. The corrected situation is shown in FIG. 5.

Suppose light source D approaches mirror 10, or the light source intensity increases otherwise, to the extent that axes of LC molecules are already in their ultimate angular position and the intensity of the attenuation in each stripe is at the highest contrast level (point $V_h$ in FIG. 4). This situation can be corrected by spreading the width of attenuated zones 24 and 26 over the entire surface area of mirror 10. This is done by means of pushbutton 22.

In the case of a two-point light source (not shown), such as a conventional automobile with two headlights, the number of variables, such as positions of the light-source images reflected in the mirror with respect to the positions of the attenuated stripes, is increased.

For example, the following versions are possible: (a) the reflected images of both light sources seen by the drivers are in the attenuated zones; (b) reflected images of both light sources are beyond the attenuated zones,; or (c) a reflected image of one light source is seen within the attenuated zone, while the other one is beyond the attenuated zone, and so forth).

In all these cases, the situation may be easily corrected, either by shifting the driver's head or by using adjustment pushbuttons 20 and 22. In spite of the striped structure, the mirror as a whole will operate as a conventional mirror, in such a manner that, with the exception of the attenuated stripes, the remaining part of the mirror will clearly show the entire situation seen through the non-attenuated parts of the mirror.

FIG. 5 is a view similar to FIG. 1, but showing the adjusted positions and widths of the attenuated stripes.

Figure 6:
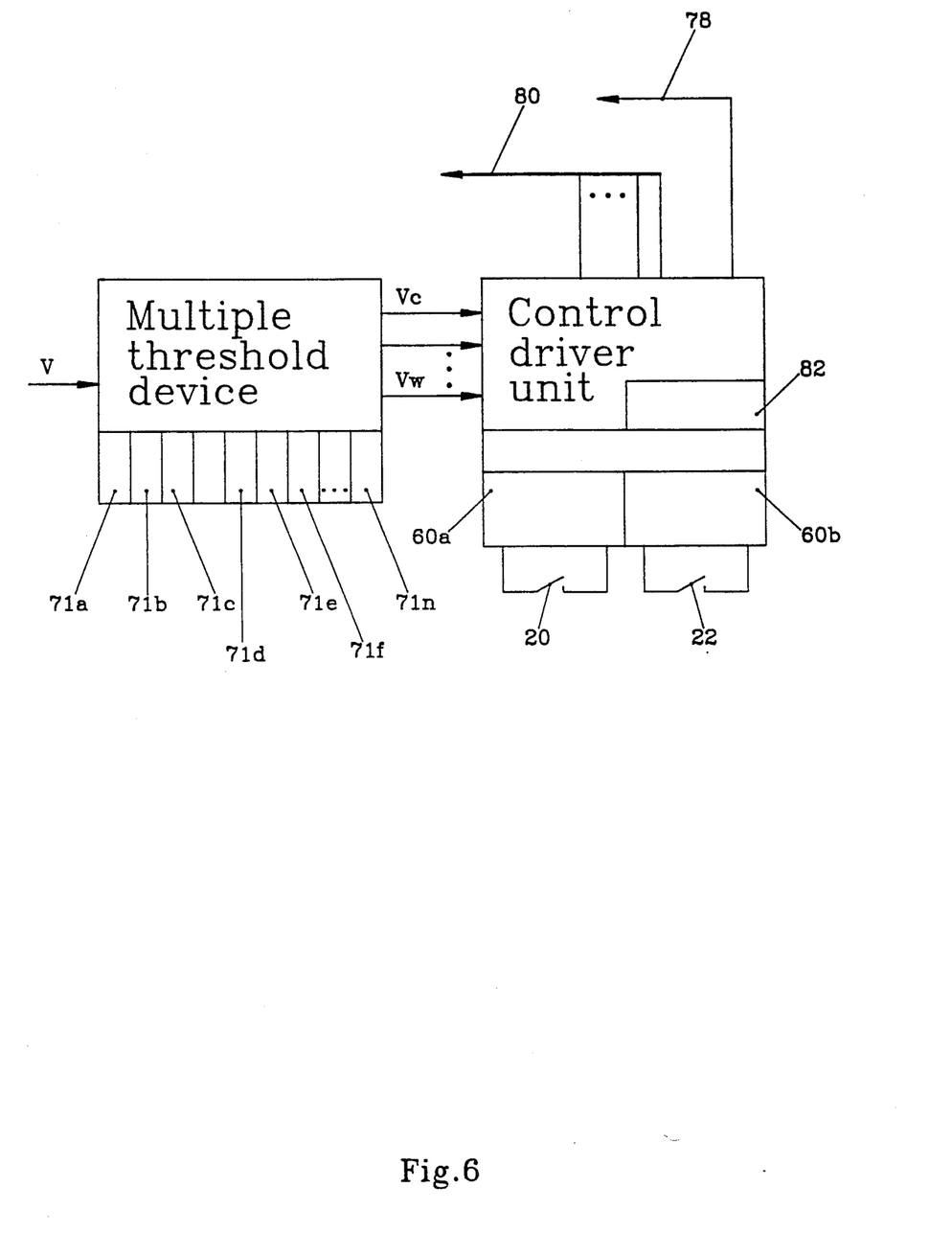
FIG. 6 shows a fragment of the control circuit for a mirror, with automatic adjustment of the width of the attenuated zone in response to the intensity of the dazzling light.

FIG. 6—Structure and Operation of the Mirror with Automatic Adjustment of the Widths of the Attenuated Zones FIG. 6 shows a fragment of the control circuit for a mirror with automatic adjustment of the widths of the attenuated zones in response to the intensity of the dazzling light.

With the exception of the portion of the control circuit shown in FIG. 6, all the remaining parts and elements of mirror 10 are the same as in the previous embodiment. Therefore, identical parts of both systems will be designated by the same reference numerals and the description of the construction and operation of these identical parts will be omitted.

The main new feature of the embodiment of FIG. 6 is that comparators 71a, 71b, . . . 71n are combined into two groups, i.e., a first group which includes comparators 71a, 71b, and 71c, provides a discrete increase in the degree of attenuation in proportion with an increase in the intensity of the incident light. In other words, threshold values of comparators 71a, 71b, and 71c increase in the direction from 71a to 71c.

A second group is formed by comparators 71d, 71e, and 71f, which discretely control (through their respective thresholds) the widths of attenuated zones 24 and 26, e.g., by sequentially covering 25%, 50%, and 100% of the remaining non-attenuated zone, respectively.

Until the upper threshold, i.e., the threshold of comparator 71c of the first group is exceeded, attenuation will be carried out by increasing the degree of attenuation in zones 24 and 26, without changing their widths.

When the threshold of comparator 71c is exceeded, the system is switched to the first comparator of the second group, i.e., by comparator 71d. When the threshold of comparator 71d is exceeded, the widths of both attenuated zones 24 and 26 are increased by 25% of the remaining non-attenuated portion of the area of mirror 10. When the threshold of comparator 71f is exceeded, the entire mirror 10 appears to be attenuated.

Such control of attenuated zones 24 and 26 is carried out through a programmable unit 82 which receives on its input output signals $V_c$ (as defined above in connection with FIG. 2) and $V_w$ (which is a an output of the second group of the comparators).

In the case of signal $V_c$, the operation will be the same as in connection with the embodiment of FIG. 2. In the case of signal $V_w$, programmable unit 82 increases the number of stripes in electrode 56 connected to power source 74 via control driver unit 72.

Synopsis, Ramifications and Scope

Thus we have provided a LC mirror with a dazzle light strip-like attenuation zone which efficiently attenuates a diverging beam of the automobile headlights mirror. The attenuated stripes are arranged so that by a slight movement of the head the driver can always see only the attenuated image of the light. The degree of attenuation is proportional to the brightness of the dazzling light and the position and the width of the attenuates stripes can be adjusted both manually or automatically.

The use of striped light attenuation mirror improves the driver's ability to detect objects which are dimly lit, does not cause an unpleasant physical sensation in the driver'eyes, produces a response to the electromagnetic spectrum which is substantially similar to the spectral response of the human eye, produces a non-distorted image, and ensures high dazzling light attenuation efficiency.

Although the antidazzle mirror has been shown and described with reference to one specific embodiment, this embodiment, its parts, materials, and configurations have been given only as examples, and many other modifications are possible.

For example, mirror 10 may be used not only as a rearview mirror of an automobile, but for any other purposes where it is necessary to attenuate reflected dazzling light. For instance mirror 10 can be used in photo studios, vanity mirrors, image intensifiers, etc.

Instead of analog signals $V_c$ and $V_w$, an A/D converter, and comparators may be used to produce digital signals which will be processed by the programmable unit for performing the operations described above.

The neutral polarizer may be replaced by a color polarizer.

The mirror may attenuate more than two light sources, a stripe-like light source, or a light source of any other configuration.

The attenuation stripes of the mirror should not necessarily be exactly vertical and may be inclined or even horizontal.

Therefore, the scope of the invention should be determined, not by the examples given, but by the appended claims an their legal equivalents.

We claim:

1. A mirror with dynamic dazzle light attenuation zone comprising:
    a multilayered mirror plate having a light-reflecting layer;
    a liquid-crystal plate having a plurality of striped mutually isolated transparent electrodes, and another layer comprising a common electrode;
    at least one light sensor facing the light incident on said mirror plate and generating a signal corresponding to the intensity of said incident light;
    a control circuit connected to said light sensor and containing a multiple threshold device, a control driver unit, and a power source, said light sensor being connected to said multiple threshold device, said multiple threshold device being connected to said control driver unit, said control driver unit being connected to said power source, to said common electrode, and to at least two groups of said striped transparent electrodes, said two groups being spaced apart from each other, each of said groups containing at least one of said transparent electrodes; and
    adjustment means for connecting transparent electrodes of each of said groups to said power source through said control driver unit so that the number of said transparent electrodes in each of said groups and the positions of said groups can be adjusted.

2. The mirror of claim 1, further including a frame which supports said multilayered mirror plate, said light sensor, and said adjustment means.

3. The mirror of claim 2 wherein said liquid-crystal plate further includes:
    a front transparent glass substrate;
    a rear transparent glass support;
    a liquid crystal unit located between said front transparent glass plate and said rear transparent glass support, said liquid crystal unit being sealed over the entire periphery of said mirror plate;
    a first orientation layer located between said liquid crystal unit and said striped transparent electrodes, and a second orientation layer located between said liquid crystal unity and said common electrode;
    said light-reflecting layer being applied onto said rear transparent glass support.

4. The mirror of claim 3 wherein said light-reflecting layer is a reflector with a broadband spectral reflectivity.

5. The mirror of claim 4 wherein said reflector is a magnesium fluoride film having a thickness within the range of 5 to 15 $\mu$m.

6. The mirror of claim 3 wherein said common electrode and said transparent striped electrodes are made of indium-tin-oxide, said common electrode having a single terminal and each of said transparent striped electrodes having its own terminal.

7. The mirror of claim 6 wherein said light sensor is coated with a filter which passes only visible light, said multiple threshold device containing a number of comparators which produce output signals corresponding to said signal generated by said at least one light sensor, said power source being connected to said control driver unit through a switch.

8. The mirror of claim 3 wherein said driver unit contains a first memory device which determines the number of said striped transparent electrodes in each said group connected to said power source through said adjustment means, and a second memory device which determines the position of each said group in the horizontal direction of said mirror, said memory devices remembering and storing the last setting of said adjustment means.

9. The mirror of claim 8 wherein said adjustment means comprises: a first pushbutton connected to said first memory device and capable of selecting from said first memory device the data corresponding to the number of those of said striped transparent electrodes which have to be connected to said power source; and a second pushbutton connected to said second memory device and capable of selecting from said second memory device the data corresponding to the position of said groups in the horizontal direction of said mirror.

10. The mirror of claim 9 wherein said control driver unit contains a programmable unit which receives said output signals of said comparators for automatically adjusting the degree of attenuation provided by said striped transparent electrodes.

11. A automobile rearview mirror with dynamic dazzle light attenuation zone comprising:
    a frame with means for attaching said frame to the interior of an automobile;
    a multilayered mirror plate supported by said frame, said mirror plate having a light-reflecting layer;
    a liquid-crystal plate having:
        a plurality of striped mutually isolated transparent electrodes, and another layer comprising a common electrode;
        a front transparent glass substrate;
        a rear transparent glass support;
        a liquid crystal unit which is located between said front transparent glass plate and said rear transparent glass support and is sealed over the entire periphery of said mirror plate;
        a first orientation layer located between said liquid crystal unit and said striped transparent electrodes and a second orientation layer located between said liquid crystal unit and said common electrode;
        said light-reflecting layer being applied onto said rear transparent glass support;
    a pair of light sensors supported by said frame, facing the light incident on said mirror plate, and generating signals corresponding to the intensity of said incident light;
    a control circuit connected to said light sensors and containing a multiple threshold device, a control driver unit, and a power source, said light sensors being connected to said multiple threshold device, said multiple threshold device being connected to said control driver unit, said control driver unit being connected to said power source, to said common electrode, to a first group of said striped transparent electrodes and to a second group of said striped transparent electrodes, said two groups being spaced apart, each of said groups containing at least one of said transparent electrodes; and adjustment means for connecting transparent electrodes of each of said groups to said power source through said control driver unit so that the number of said transparent electrodes in each said group and the positions of said groups can be adjusted.

12. The mirror of claim 11 wherein said light sensors are coated with filters which pass only visible light, said multiple threshold device containing a number of comparators which produce output signals corresponding to said signal generated by said sensors, said power source being connected to said control driver unit through a switch, said driver unit containing a first memory device which determines the number of those of said striped transparent electrodes in each of said groups which have to be connected to said power source through said adjustment means and a second memory device which determines the position of each of said groups in the horizontal direction of said mirror, said memory devices remembering and storing the last setting of said adjustment means.

13. The mirror of claim 12 wherein said adjustment means comprises: a first pushbutton connected to said first memory device and selecting from said first memory device data corresponding to the number of said striped transparent electrodes to be connected to said power source; and a second pushbutton connected to said second memory device and selecting from said second memory device data corresponding to the position of said groups in the horizontal direction of said mirror.

14. The mirror of claim 13 wherein said control driver unit contains a programmable unit which receives said output signals of said comparators for automatically adjusting the degree of attenuation provided by said striped transparent electrodes.

15. The mirror of claim 14 wherein said light-reflecting layer is a magnesium fluoride film having a thickness within the range of 5 to 15 $\mu$m.

16. The mirror of claim 14 wherein said common electrode and said transparent striped electrodes are made of indium-tin-oxide, said common electrode having a single terminal and each of said transparent striped electrode having its own terminal.

17. An automobile rearview mirror with dynamic dazzle light attenuation zone comprising:

a frame with means for attaching said frame to the interior of an automobile;

a multilayered mirror plate supported by said frame, said mirror plate having a light-reflecting layer;

a liquid-crystal plate having:
  a plurality of a striped mutually isolated transparent electrodes, and another layer comprising a common electrode;
  a front transparent glass substrate;
  a rear transparent glass support;
  a liquid crystal unit which is located between said front transparent glass plate and said rear transparent glass support and is sealed over the entire periphery of said mirror plate;
  a first orientation layer located between said liquid crystal unit and said striped transparent electrodes and a second orientation layer located between said liquid crystal unit and said common electrode;
  said light-reflecting layer being applied onto said rear transparent glass support;

a pair of light sensors supported by said frame, facing the light incident on said mirror plate, and generating signals corresponding to the intensity of said incident light;

a control circuit connected to said light sensors and containing a multiple threshold device, a control driver unit, and a power source, said light sensors being connected to said multiple threshold device, said multiple threshold device being connected to said control driver unit, said control driver unit being connected to said power source, to said common electrode, to a first group of said striped transparent electrodes, and to a second group of said striped transparent electrodes, said two groups being spaced apart, each of said groups containing at least one of said transparent electrodes;

adjustment means for connecting transparent electrodes of each of said groups to said power source through said control driver unit so that the number of said transparent electrodes in each said group and the positions of said groups can be adjusted; said adjustment means comprising a first pushbutton connected to said first memory section and capable of selecting from said first memory section those data which corresponds to the number of said striped transparent electrodes which have to be connected to said power source; and a second pushbutton connected to said second memory section and capable of selecting from said second memory section those data which corresponds to the position of said groups in the horizontal direction of said mirror;

said light sensors being coated with filters which pass only visible light, said multiple threshold device containing a number of comparators which produce output signals corresponding to said signal generated by said sensors, said power source being connected to said control driver unit through a switch, said driver unit containing a first memory device which determines the number of said striped transparent electrodes in each of said groups which have to be connected to said power source through said adjustment means and a second memory device which determines the position of each of said groups in the horizontal direction of said mirror, said memory devices remembering and storing the last setting of said adjustment means.

18. The mirror of claim 17, wherein said control driver unit contains a programmable unit which receives said output signals of said comparators for automatically adjusting the degree of attenuation provided by said striped transparent electrodes.

19. The mirror of claim 18 wherein said light-reflecting layer is a magnesium fluoride film having a thickness within the range of 5 to 15 $\mu$m.

20. The mirror of claim 18 wherein said common electrode and said transparent striped electrodes are made of indium-tin-oxide, said common electrode having a single terminal and each of said transparent striped electrode having its own terminal.

* * * * *